United States Patent
Suchak et al.

(10) Patent No.: US 8,574,521 B2
(45) Date of Patent: Nov. 5, 2013

(54) GAS STREAM PURIFICATION APPARATUS AND METHOD

(75) Inventors: Naresh J. Suchak, Glen Rock, NJ (US); Steven Finley, Wayne, NJ (US)

(73) Assignee: Linde Aktiengesellschaft, Munich (DE)

( * ) Notice: Subject to any disclaimer, the term of this patent is extended or adjusted under 35 U.S.C. 154(b) by 488 days.

(21) Appl. No.: 12/893,043

(22) Filed: Sep. 29, 2010

(65) Prior Publication Data
US 2012/0076716 A1 Mar. 29, 2012

(51) Int. Cl.
B01D 53/38 (2006.01)
B01D 53/62 (2006.01)
B01D 53/78 (2006.01)

(52) U.S. Cl.
USPC ........... 423/224; 423/225; 423/232; 423/234; 423/581; 588/317; 588/320

(58) Field of Classification Search
USPC ................ 423/220, 224, 225, 232, 234, 581; 588/317, 320
See application file for complete search history.

(56) References Cited

U.S. PATENT DOCUMENTS

| | | |
|---|---|---|
| 3,950,369 A | 4/1976 | Gent |
| 5,206,002 A | 4/1993 | Skelley et al. |
| 5,316,737 A | 5/1994 | Skelley et al. |
| 6,136,284 A | 10/2000 | Hwang et al. |
| 6,162,409 A | 12/2000 | Skelley et al. |
| 6,197,268 B1 | 3/2001 | Hwang et al. |
| 6,294,139 B1 | 9/2001 | Vicard et al. |
| 6,649,132 B1 | 11/2003 | Hwang et al. |
| 6,761,863 B2 | 7/2004 | Hwang et al. |
| 6,875,409 B1 | 4/2005 | Zhou et al. |
| 7,303,735 B2 | 12/2007 | Suchak et al. |
| 7,632,475 B2 | 12/2009 | Suchak et al. |
| 7,766,995 B2 | 8/2010 | Suchak et al. |
| 2004/0101460 A1 | 5/2004 | Arno et al. |
| 2008/0017590 A1 | 1/2008 | Suchak et al. |
| 2010/0119427 A1 | 5/2010 | Suchak |

OTHER PUBLICATIONS

Ershov et al., "The Kinetics of Ozone Decomposition in Water, the Influence of pH and Temperature." Russ. J. of Physical Chem. A (2009), vol. 83, No. 8, pp. 1295-1299.*
Nat'l Fire Protection Ass'n ("NFPA"), "Appendix 1, NFPA 400 Hazardous Materials Code." 2010 Ed., published Jan. 1, 2010 (as per http://www.freestd.us/soft1/579876.htm ). Viewed Aug. 8, 2013 at http://www.nfpa.org/~/media/files/research/appendix_1.ashx .*
International Search Report and Written Opinion for PCT/US 11/41568, Date of Mailing: Oct. 28, 2011, Authorized Officer: Lee W. Young, 14 pp.

(Continued)

Primary Examiner — Stuart Hendrickson
Assistant Examiner — Daniel Berns
(74) Attorney, Agent, or Firm — Joshua L. Cohen

(57) ABSTRACT

An apparatus and method for removing contaminants from a gas stream is provided which includes (a) introducing the gas stream into a reaction chamber of a scrubber; (b) oxidizing first contaminants in a liquid phase with a reactive species in a sump of the scrubber for providing an oxidizing solution; (c) oxidizing second contaminants in a gas phase of the gas stream above the sump with excess reactive species disengaging from the oxidizing solution in the sump; (d) oxidizing and scrubbing third contaminants in a gas-liquid contact assembly disposed above the gas stream.

8 Claims, 4 Drawing Sheets

(56) References Cited

OTHER PUBLICATIONS

K.R. Jethani, N.J. Suchak, J.B. Joshi, Selection of reactive solvent for pollution abatement of NOx, Gas Separations and Purifications, Mar. 1990, pp. 8-28, vol. 4, Butterworth & Co. (Publishers) Ltd., UK.

W.M. Rohrer, Jr., J.M. Koltick, Jr., N.J. Suchak, J. Brown, A.P. Skelley, Slip Stream Test of Cannon Technology's Low Temperature Oxidation (LTO) System at Duquesne Light Company's Elrama Plant, Twelfth annual international Pittsburgh Coal Conference, Sep. 1995, pp. 675-680, Univ. of Pittsburgh School of Engineering, Pittsburgh, PA, U.S.A.

Y. Fu, U.M. Diwekar, N.J. Suchak, Optimization Framework for Modeling the Low Temperature Oxidation Process for NOx Reduction, Advances in Environmental Research, 2000, vol. 3(4), pp. 424-438, Pergamon Elsevier Science Ltd., U.S.A.

* cited by examiner

GAS STREAM PURIFICATION APPARATUS AND METHOD

BACKGROUND

The present apparatus and method embodiments relate to purification of gas, such as carbon dioxide, for use in chemical, pharmaceutical and beverage use.

Known methods for carbon dioxide ($CO_2$) recovery utilize a series of absorption and adsorption steps to remove impurities from a feed gas. Feed gas streams are normally waste streams from processes where $CO_2$ is a significant by-product. The feed gas stream also contains impurities that are undesirable for the final product and must be removed through purification processes. Feed gas streams originate from manufacturing activities that include for example ammonia production, fertilizer production, fermentation and combustion processes.

Feed gas streams include impurities that are unacceptable for use with a subset of industries that use $CO_2$, including pharmaceutical production, carbonation of beverages and processing of food. Such impurities include sulfur compounds, volatile organic compounds such as aromatic and aliphatic hydrocarbons, odorous compounds (including but not limited to hydrogen sulfide ($H_2S$), carbonyl sulfide (COS), (dimethyl sulfide (DMS), mercaptans), heavy metals, particulate matters and nitrogen oxides, among others. The species and concentration of the impurities are a function of the process that produces the feed gas. For example, fermentation processes produce alcohol, a volatile hydrocarbon. Combustion processes are likely to produce sulfur in the feed gas originating from the fuel used for combustion. These impurities must be reduced to concentrations that are acceptable for the end use; especially for beverage, food and pharmaceutical applications where regulatory and voluntary guidelines specify maximum allowable concentrations for impurities. Certain of these impurities even when present in amounts below regulatory, mandatory or voluntary guidelines are sometimes not desirable at all, such as impurities that impart taste in beverages or where $CO_2$ is used in direct contact with pharmaceutical drug products. There also are self-imposed preferences by customers in sourcing $CO_2$ for processing and accepting for use. Therefore, producers are forced to continue to drive improved quality of $CO_2$.

Conventional $CO_2$ production facilities use a series of steps to concentrate and purify $CO_2$ product. All of the common impurities require a specific treatment in order to be removed from the feed gas stream. Some impurities are very soluble in water and can be removed using absorption with either water or a caustic solution in a wet scrubber. Other impurities can be removed using adsorption, wherein the impurity is bound to a surface or a chemical component on the surface and or held in pores of adsorbent material. Some of these processes are reversible by using either heat or pressure swings during a regeneration step. Other process materials cannot be easily regenerated and therefore the adsorbent must be sacrificed when it has reached its saturation limit. This creates a burden on a $CO_2$ production facility because of the expense of replacing material and the opportunity cost due to downtime required to service the material beds. Sacrificial beds are also very sensitive to the incoming concentration of impurities, since they have a finite capacity for retaining the impurities.

A known $CO_2$ purification and production process is shown in FIG. 1. The stages of said process include providing the $CO_2$ feed gas from a production process; a pre-compression cleanup stage, wherein the primary cleaning of $CO_2$ feed gas is accomplished by water washing, aqueous alkaline scrubbing and oxidative scrubbing using potassium permanganate ($KMnO_4$) at low pressure. Depending upon the source for the feed gas and impurities in the gas, all three types of scrubbing may not be required.

A post-compression cleanup stage for the impurities is mainly by adsorption processes, the impurities handled being at a much lower concentration than in the pre-compression stage.

FIG. 2 shows an arrangement of a known feed gas scrubbing occurring in the pre-compression cleanup stage of FIG. 1.

Absorption processes, such as that of FIG. 1, provide a less expensive way of removing a bulk of soluble impurities such as alcohol, aldehydes, sulfur compounds, etc. Using chemical reagents such as potassium permanganate ($KMnO_4$), sparingly soluble impurities such as nitrogen oxides (NOx) are oxidized and removed. However, the effectiveness of absorption processes is sometimes limited due to low solubility of impurities and low allowable purge of spent scrubbing medium. In order to handle increased impurity level, robust and reliable performance of the pre-compression stage is vital in maintaining quality of the product and effectiveness of the downstream purification stage.

As shown in FIG. 1, in the pre-compression stage, primary cleaning of $CO_2$ feed gas is done by wet scrubbing (absorption processes). Primary cleaning by wet scrubbing is achieved by use of one or more scrubbing towers with use of one or more reagents.

Generally, $CO_2$ containing feed gas stream is first contacted with water in a co-current or countercurrent fashion for direct contact. The water acts as a scrubbing agent, dissolves soluble impurities and carries away the particulates in the waste stream. This step requires huge amounts of wash water in a once through mode and generates a large quantity liquid effluent stream that must be processed. If the water wash stream is recirculated in a closed loop, concentration of impurities gradually builds up and removal efficiency deteriorates. When the scrubber water has absorbed all the impurities it is said to be saturated. Saturated water must be drained from the scrubber and replaced with clean water in order for more impurities to be removed. In a recirculating system the water is always partially saturated so a good balance must be made between fresh water make-up and the concentration of impurities in the $CO_2$ exiting the scrubber. Typical impurities that are removed in water washing are acetaldehyde, alcohols, ketones, ammonia and hydrogen chloride (HCl), for example.

For removal of acidic (impurities), caustic/soda based water scrubbers are used downstream of water wash scrubber. Sodium carbonate ($Na_2CO_3$) or sodium hydroxide (NaOH) is dosed in an aqueous recirculation medium to maintain slight alkalinity. Acidic impurities such as sulfur dioxide ($SO_2$) and HCl are removed, along with some hydrogen sulfide ($H_2S$) and $CO_2$, by wet alkaline scrubbing to form water soluble compounds.

Potassium permanganate ($KMnO_4$) is a powerful oxidizer and can oxidize a number of impurities to compounds that are soluble or insoluble in the potassium permanganate solution. Amongst many impurities oxidized by scrubbing in $KMnO_4$ scrubbers, removal of nitrogen oxides in particular is unique. Other impurities that are removed include sulfur compounds and some odorous and taste imparting compounds. In order to maintain high efficiency, permanganate scrubbers must operate under alkaline conditions. $CO_2$ in the feed gas stream has the effect of neutralizing the scrubber solution by forming carbonate and bicarbonate. Under neutral conditions, Manganese Dioxide ($MnO_2$) precipitates creating serious operational issues due to fouling of scrubber packing and clogging of the scrubber components.

The effectiveness of permanganate scrubbers is impacted by the incoming NOx concentration. Often, the capacity of $CO_2$ plants must be reduced when the feed gas concentration exceeds the design range. It is also common to require frequent service for permanganate scrubbers when NOx levels exceed the normal range. Some production facilities that experience spikes in nitrogen oxide concentrations in the feed gas must shut down the system ever few hours to remove the old potassium permanganate solution and replace it with new or fresh solution. It is not uncommon to require up to more than one or two shutdowns per day to service permanganate scrubbers. In some cases $CO_2$ producers reduce the plant capacity to increase the length of time the permanganate scrubber can stay in service before it needs to be re-charged.

Post compression cleanup is somewhat of a polishing stage and mainly consists of adsorption processes to further reduce impurities. The most commonly used beds include Zinc Oxide (ZnO), Silica, Alumina and Carbon for removing many different impurities.

In addition, high pressure water washing may also be used to lower soluble impurities. Some configurations include catalytic reactors to convert some hard to treat impurities.

Adsorption beds remove one or a plurality of impurities or component impurities in the feed gas. ZnO, ferrous and ferric oxide beds for removal of $H_2S$, activated carbon is effective in adsorbing impurities like acetaldehyde, aromatic hydrocarbon and other volatile hydrocarbons. Silica beds are effective in removing water, oxygenates such as alcohols. The capacity of an activated carbon bed is a function of the impurity's species and concentration. The capacity of a given bed is also limited by the amount of absorbent it holds, therefore it is used as a polishing bed. It is advantageous to remove as much of these impurities as possible in a pre-compression cleanup stage before the feed gas reaches the polishing bed.

Even beds that can be regenerated are affected by the concentration of impurities, because the operating cycle is affected by the amount of time it takes for the bed to reach capacity. Regeneration cycles tend to add cost to the process due to their need for heating energy or pressurization. For example, carbon adsorption beds require a large amount of steam to raise the temperature of the bed to the temperature needed to remove the adsorbed impurities. Often $CO_2$ producers are adversely affected by "spikes in impurities" that are in excess of the design capacity of polishing beds designed to remove them.

Therefore, $CO_2$ producers will want to remove as much of the impurities as possible in precompression cleanup stage upstream of the adsorption and polishing steps. A $KMnO_4$ based oxidative scrubber is generally placed downstream of water wash scrubbers or alkaline scrubber. Improving reliability in oxidative scrubbing will reduce not only impurities due to oxidative chemistry, but also provide an additional stage for removal of soluble impurities.

As mentioned above, for oxidative scrubbing, $KMnO_4$ solution is used in an aqueous scrubber. $KMnO_4$ is a strong oxidant. However, the oxidation occurs in the liquid phase and has the following issues. Impurities from the gas phase are required to first dissolve in order to react with $KMnO_4$. Some of these impurities have very poor solubility and require large gas liquid contact to effectively transport across the gas-liquid interface. Most scrubbers do not provide adequate scrubbing when impurities spike during production. $CO_2$ in the feed gas neutralizes alkalinity of $KMnO_4$ solution which significantly retards oxidation rates and removal efficiencies. Contaminants such as $H_2S$, DMS COS, mercaptans impart objectionable taste and odor, even at very low concentrations. Therefore, inefficiencies in oxidative scrubbing are not acceptable.

Precipitation of manganese oxides fouls packing in absorption columns which reduces gas-liquid contacting surface area, thereby rendering the columns to be less efficient and not as cost-effective.

BRIEF DESCRIPTION OF THE DRAWINGS

For a more complete understanding of the present embodiments, reference may be had to the following drawing figures taken in conjunction with the description of the embodiments, of which.

DETAILED DESCRIPTION OF THE INVENTION

Figure 1:
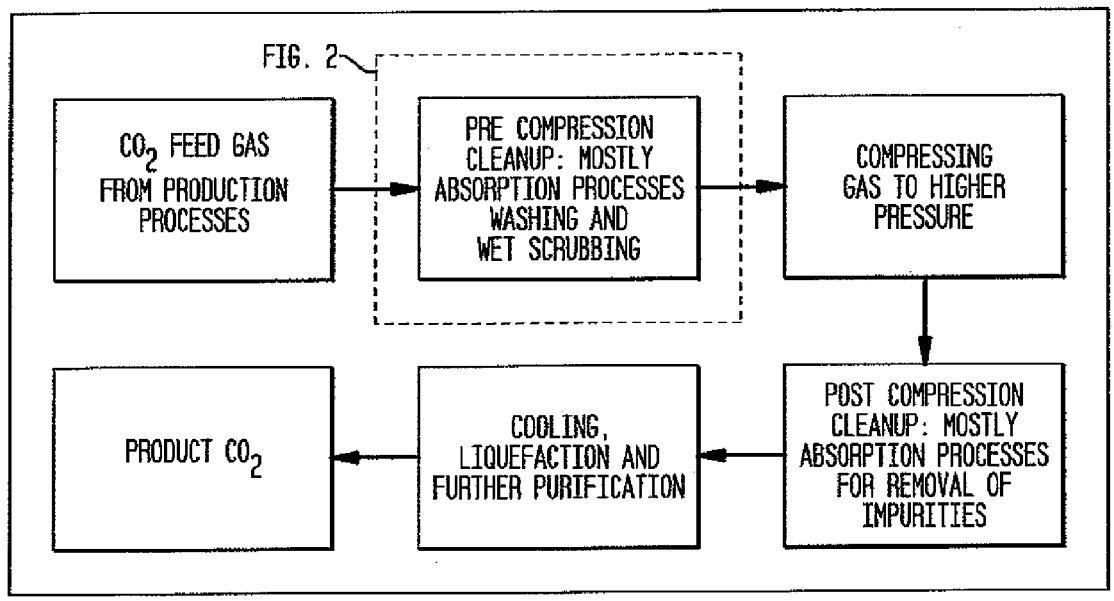
FIG. 1 shows known stages of a $CO_2$ purification and production process for a $CO_2$ feed gas stream.

An oxidative step often modifies impurities to a more soluble form. The present embodiments substitute ozone for $KMnO_4$ as the oxidative reagent to oxidize impurities. For example, among many reactions of ozone with various impurities, oxidation of nitrogen oxides (NO and $NO_2$) results in soluble forms, namely nitrogen trioxide ($NO_3$) and dinitrogen pentoxide ($N_2O_5$) which can be easily absorbed and retained in aqueous medium of the scrubber; reducing the burden on downstream polishing equipment. Additionally, other organic and inorganic contaminants, especially taste and odor imparting contaminants such as $H_2S$, DMS, COS, are oxidized and scrubbed, or scrubbed and oxidized.

The present embodiments (i) use ozone ($O_3$) to oxidize impurities in a gaseous stream, and (ii) treat aqueous effluents with ozone. The present embodiments utilize these two technologies by integration in a wet scrubbing stage of $CO_2$ cleanup and may be used to purify $CO_2$, or other gases, for chemical, pharmaceutical and beverage use, for example. Plasma may be used as an alternative to ozone.

The pre-compression cleaning stage (primary cleaning) of $CO_2$ purification and production process is rendered more effective by the present embodiments.

Improving efficiency and reliability of absorption-based contaminant removal processes reduces load on post-compression cleanup stage. The present embodiments address issues with oxidative scrubbers and improve overall efficiency of the absorption process in the pre-compression stage.

The present embodiments provide a method to improve an oxidative scrubbing step in pre-compression stage of $CO_2$ cleanup. The embodiments also reduce the impurity "spikes" that occur in polishing beds.

Ozone is a strong oxidant and has been used effectively to oxidize impurities such as NOx and elemental mercury (Hg) in the gas phase. Ozone, when mixed with a gas stream containing NOx, transforms insoluble NOx compounds into highly soluble $N_2O_5$. Simple aqueous scrubbing removes these oxidized impurities.

However, ozone oxidation in a gas phase alone wherein many impurities are to be acted upon may not react quickly enough for a particular process. That is, mixing ozone with the feed gas causes ozone dilution. At this low concentration, ozone may not react with some of these impurities within the necessary amount of time. Some of the impurities when scrubbed begin building-up equilibrium concentrations in the scrubbing medium (or bed) as the impurities are not depleted. Dosing additional ozone in the gas phase so that the excess ozone will absorb in the scrubber to oxidize absorbed impurities in the aqueous scrubbing medium may also not be effective enough. Therefore, the present embodiments provide ozone in both the gas and liquid phase.

Ozone is a highly reactive and unstable gas and it is produced on-site, on-demand in 2% to 18% by weight in oxygen or air. When this 2%-18% by weight ozone in $O_2$ is contacted directly with scrubbing liquor, it forms a highly oxidizing aqueous medium which depletes impurities absorbed and accumulated in the liquid or liquor scrubbing medium. However, scrubbing with this ozonated aqueous medium may not alone be effective enough to oxidize impurities such as NOx in the gas phase because NOx is sparingly soluble in the gas phase.

Accordingly, the present embodiments achieve in a single measure both gas phase homogeneous oxidation with ozone and heterogeneous oxidation in liquid phase without compromising effectiveness. The embodiments are also configured around scrubbers which are industry preferred or existing in the pre-compression cleanup stage. Retrofitting the embodiments to existing scrubbers may not require much effort in terms of hardware changes.

Figure 3:
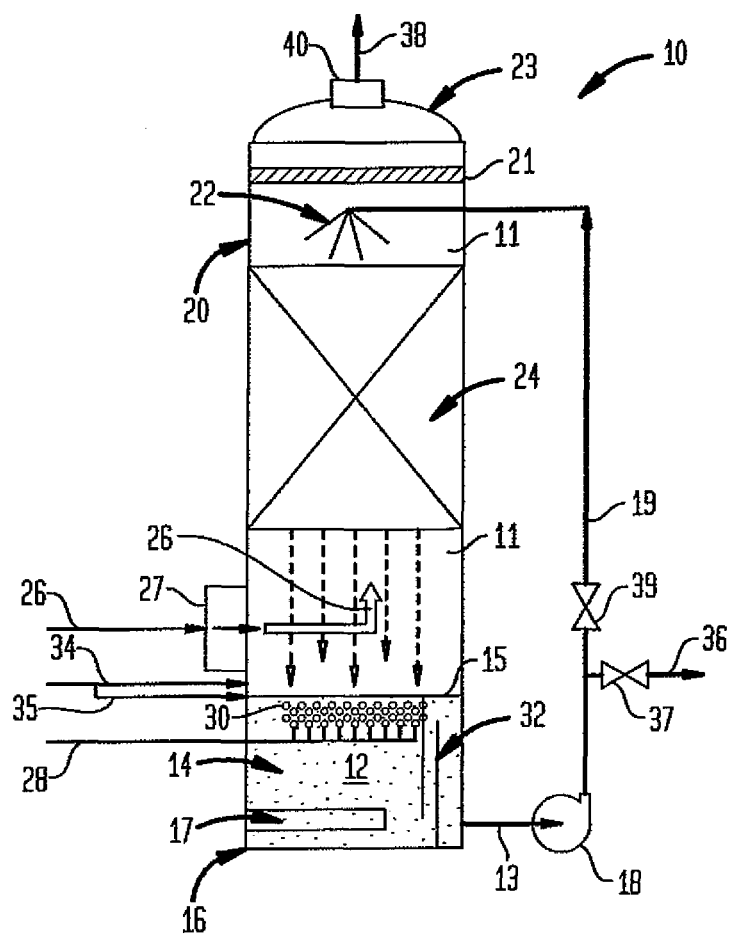
FIG. 3 shows a feed gas scrubber column according to the present embodiments.

Referring to FIG. 3, there is shown a packed column scrubber 10 having a reaction chamber 11 therein configured to scrub the feed gas in a counter-current mode. The aqueous scrubbing medium 12 is held in sump 14 located in a bottom section 16 of the column 10. An adsorbent cartridge 17 may be disposed in the sump 14 at the bottom section 16. The cartridge 17 may contain adsorbents to retain scrubbed or oxidized contaminants in the scrubbing medium 12. The cartridge 17 can be replaced with a new cartridge having fresh adsorbents, or the cartridge can be removed and the adsorbents replaced or rejuvenated for subsequent use. Pump 18 withdraws the aqueous medium 12 through a pipe 13 in communication with the sump 14 and directs the medium through a pipe 19 to a top section 20 of the column where it is distributed by for example a spray nozzle 22, distribution weir (not shown) or other suitable internal device to irrigate the top section 20 of a packed bed 24. A mist eliminator 21 is disposed across an interior of the scrubber 10 at the top section 20 between the spray nozzle 22 and a top 23 of the column 10. The aqueous medium 12 distributed on the bed 24 flows downward by gravity. Wetted packings in the packed section 24 provide the necessary surface area for exchange of impurities, i.e. scrubbing, between feed gas 26 introduced into the reaction chamber 11 at scrubber inlet 27 disposed between a bottom of the bed 24 and the sump 14, and flowing upwards in the column 10 above the sump 14 and aqueous medium gradually flowing downward from the packed section 24. The aqueous medium 12 rich with impurities and exiting the packed section 24 is returned back to a top of the sump 14. The sump contains a liquid scrubbing agent such as for example sodium carbonate, caustic soda, etc.

In this embodiment, ozone 28 at 2%-18% by weight is introduced beneath a surface 15 of the medium 12 in the sump 14. Ozone bubbles 30 rise and partially dissolve in the aqueous medium 12 which is rich with impurities. Ozonating this section of the sump 14 maximizes the extent of oxidization of impurities in the aqueous phase. At least one weir 32 or a plurality of weirs is disposed in the sump 14 for contact with medium 12 and, with the pipe 13, maximizes retention or residence time of the ozonated aqueous medium 12 in the sump 14 before it is recirculated to the top of the packed section 24. The weirs 32 alter the direction of the flow of the aqueous medium 12 which would otherwise flow immediately and directly into the pipe 13 from the sump 14. The flow directing assembly of the weirs 32 increase the residence time of the aqueous medium 12, which contains the ozone, in the sump 14 by providing a plug flow of the aqueous medium 12 rather than a back mixed flow. This results in reduced mixing in the region of the weirs 32, so that the ozone flows with the impurities or contaminants in the medium 12 and accordingly reacts evenly and more predictably with same through the flow area. The residence time of the ozone in the medium 12 during such plug flow is more controllable and predictable. This arrangement minimizes dissolved ozone or bubbles of ozone carried with medium 12 through pipe 13 and stripping from the spray of the aqueous stream at the top of the packed column 10 when it comes in contact with the feed gas 26 exiting the packed section 24.

The remainder of the ozone in bubbles disengages from the aqueous medium and mixes with the incoming bulk of the feed gas 26 under the packed section 24. The gas void in the packed section 24 is generally between 60% to 95% of the total packed volume. The vessel volume under the packed section 24 and the gas void in the packing provide a residence time for the ozone to react with impurities such as NOx, Hg, $H_2S$, etc. in the gas. Oxidation in the gas phase begins as the ozone bubbles 30 leave the liquid surface 15 and start to mix with the incoming gas 26. The oxidation of impurities in the gas phase continues in the space under and inside the packed section. Homogeneous oxidation in the gas phase and absorption of oxidized impurities to the aqueous medium both occurs simultaneously in the packed section.

Oxidation of NOx with ozone in the feed gas can be summarized as follows.

In the first reaction, NO is converted to $NO_2$. In the consecutive reaction, ozone further oxidizes $NO_2$ to $N_2O_5$.

$$NO+O_3 \rightarrow NO_2+O_2$$

$$NO_2+O_3 \rightarrow NO_3+O_2$$

$$NO_2+NO_3 \leftrightarrow N_2O_5$$

$N_2O_5$ is very soluble compared to $NO_2$ and NO and therefore, can be very easily scrubbed with water.

$$N_2O_5+H_2O \rightarrow 2HNO_3$$

In addition many other contaminants such as elemental mercury Hg° are also oxidized.

$$Hg°+O_3 \rightarrow Hg^{2+}+O_2$$

Sulfur dioxide reacts with water forming sulfurous acid.

$$SO_2+H_2O \leftarrow \rightarrow H_2SO_3$$

Sulfurous acid is easily oxidized to sulfuric acid or sulfate ion in the aqueous medium.

$$H_2SO_3+O_3 \rightarrow H_2SO_4$$

Alkaline reagents such as NaOH or $Na_2CO_3$ may be added in the aqueous medium to increase effective and neutralize acidic products formed due to oxidation.

$$H_2SO_4 + 2NaOH \rightarrow Na_2SO_4 + 2H_2O$$

$$HNO_3 + NaOH \rightarrow NaNO_3 + H_2O$$

Wet ozone is very reactive even in the gaseous phase.

Odorous compounds such as $H_2S$ and other reduced sulfur are readily oxidized by ozone in both gas and aqueous medium forming sulfates.

$$S^{-2} + 3O_3 \rightarrow SO_3^{-2} + O_2$$

$$SO_3^{-2} + O_3 \rightarrow SO_4^{-2}$$

In the scrubber sump 14, ozone dissolves in aqueous medium forming hydroxyl (and perhydroxy) radicals which are even more reactive than ozone. Dissolved ozone reacts with carbonaceous impurities, converts to more stable form. In particular, odorous compounds when captured in aqueous medium are oxidized easily with dissolved ozone. Oxidative scrubbing eliminates organic sulfur from the feed gas. Presence of ozone in the gas phase and scrubbing with ozonated aqueous medium kills microbes and disinfects the treated feed gas 38 which is exhausted or vented from an outlet 40 at a top of the column 10. The mist eliminator 21 coalesces mist from the spray nozzle 22 into droplets so that the droplets fall under the effect of gravity into the bed 24. The mist eliminator also prevents liquid carryover into the treated feed gas 38 exiting the outlet 40.

Also the residence time requirement is short enough not to impact the design of the scrubber in any significant way. In fact, existing $CO_2$ recovery and purification systems can be retrofitted with this technology without modifying the scrubber's design.

Ozone is produced on-site based on process demand. The rate of ozone production can be ramped up or down very quickly. Therefore, with the help of simple control system, using feed forward or feedback signal from on-line analyzers, ozone production can be controlled based upon levels of impurities in the feed gas and the treated feed gas exiting the scrubbing system. Another feed-back system can be based upon residual ozone levels in the treated feed gas.

A make-Lip aqueous medium stream 34 will usually contain water and reagents such as caustic or sodium carbonate. Make-up water and reagent can be added in an alternate stream 35 directly into the sump 14. There may be additional instrumentation and hardware (not shown) such as pH probe to measure pH of the sump 14, temperature probes, liquid level sensors, etc. to maintain operating parameters of the system within desired ranges. The recirculating aqueous medium 12 may need to be cooled or heated based on process requirements. A purge pipe 36 line is generally discharged to a waste water treatment facility for further treatment of captured contaminant. Valves 37,39 are used to control flow of the oxidizing solution through the pipe 19 and the purge pipe 36. In other words, if the liquid in the sump 14 is saturated with contaminants and must be exhausted, then the valve 37 is opened while the valve 39 is closed. The saturated stream can then be exhausted to waste. Closing the valve 37 and opening the valve 39 permits flow of the oxidizing solution to the nozzle 22. Alternatively, valve 39 may also be kept partially open at all times as a system with a continuous purge. Generally, organics are digested by anaerobic and aerobic digestion. Nitrate captured in the purge stream is advantageously used in anaerobic digestion for reduction of organic carbon.

Thus, ozone based oxidative scrubbing makes removal of impurities easier and reduces the burden on downstream polishing processes in the post compression purification stage. Many other alkaline or alkaline earth metal (such as calcium, magnensium hydroxides, carbonates) can be used for scrubbing in combination with specific reagents and/or adsorbents that bind specific scrubbed and oxidized contaminants in the aqueous phase.

Figure 2:
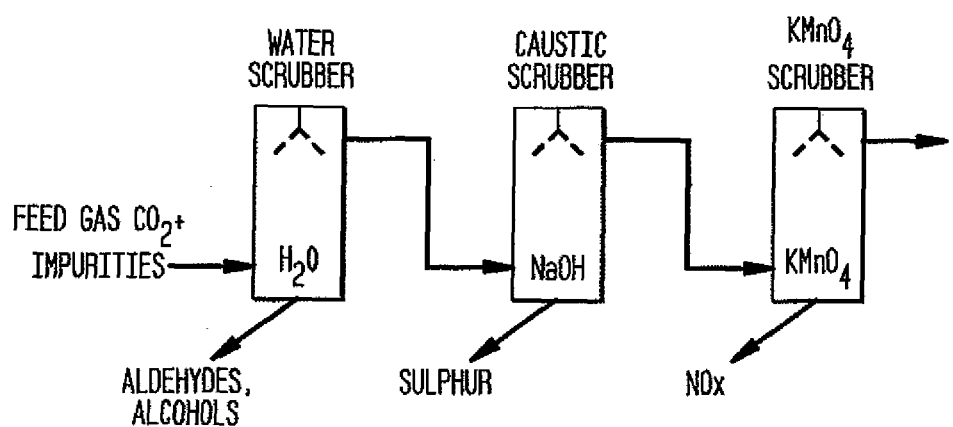
FIG. 2 shows known feed gas scrubbing in the pre-compression cleanup stage of FIG. 1.
Figure 4:
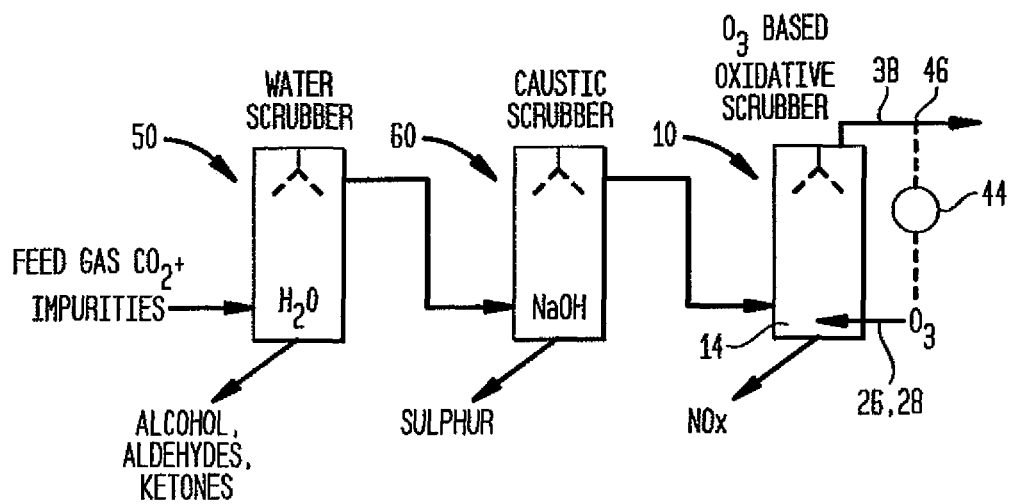
FIG. 4 shows a pre-compression cleanup stage including an ozone based scrubber of the present embodiments.

In FIG. 4, there is shown a pre-compression $CO_2$ clean up stage with the $O_3$ based oxidative scrubber 10, instead of using the $KM_nO_4$ scrubber of FIG. 2. The following parameters provide the range to practice the embodiments.

Temperature of the feed gas 26 entering the scrubbing inlet 27 can be in the range of 4° to 60° C.

Pressure of the feed gas 26 in pre-compression clean up stage can be 1 Bar to 2 Bar absolute.

The pH of the scrubbing or aqueous medium 12 in oxidative scrubbing can be 2 to 11 with total dissolved solids in the range of 0 to 10% by wt.

The reagent in the scrubbing medium 12 to neutralize can be alkali or alkaline earth metal or ammonia hydroxides, carbonates, bicarbonates or mixtures thereof.

Although the process parameters provided above may be used for commercial operation, the process parameters can also operate with high efficiency outside this range of parameters. For example, the method and apparatus embodiments described can also be used for scrubbing of a $CO_2$ stream above 2 Bar pressure.

The scrubber 10 can be used with a water scrubber 50 and/or a caustic scrubber 60, both of which are known. As shown in FIG. 4, the scrubber 10 includes a controller/analyzer 44 in communication with a sensor 46 which senses the composition of the treated feed gas 38, and is operably associated with the feed gas 26 and the ozone 28. In this arrangement of FIG. 4, the amount of ozone necessary to be provided to the sump 14 will be proportional to the purity of the treated feed gas 38 existing the scrubber column 10.

The embodiments provide: a robust and reliable oxidative system which provides stronger oxidation of a broader range of impurities in both gas (the feed gas) and liquid phase (aqueous scrubbing medium); an oxidation system that promptly and effectively responds to surges in impurity and mitigates concerns of overloading post-compression clean up system; $O_3$ based oxidative scrubbing which will not cause operational challenges, such as fouling production equipment; a by-product of reaction in the scrubber (nitrate) which is a beneficial effluent for digesting organic impurities in wastewater treatment facilities; and a cost effective method to remove impurities using scrubbing systems where water or water/caustic solutions are used to absorb impurities rather than more expensive solutions like $KMnO_4$.

The present embodiments can be used to treat gases other than carbon dioxide ($CO_2$) feed gas. For example, the present embodiments can be used to treat a nitrogen ($N_2$) feed gas stream.

The present embodiments can also be used as a clean-up for process gas, which is useful in production of chemicals, or can be used in a pollution abatement system for removing pollutants from waste gas streams before being exhausted to the atmosphere.

The embodiments can include analytical equipment and controls to control the ozone flow rate and injection point to accommodate impurity species and concentration.

The embodiments can be retrofitted to a caustic scrubber if a $KMnO_4$ scrubber is not present in the configuration.

The embodiments can be used with a scrubber having a packed column, a plate column, a tray column, a spray column or any other type of gas-liquid contacting device.

Additional benefits of the present embodiments include improved effective scrubbing of the process gas stream; a reduction of a concentration of impurities in the sump liquid, thereby reducing pressure on the system which translates into a more effective scrubbing of the feed gas stream; and treatment of the liquid to provide a reduction in wastewater.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. A method for removing contaminants from a gas stream, comprising;
    (a) introducing the gas stream into a reaction chamber of a scrubber;
    (b) introducing reactive species in a liquid phase into a sump of the scrubber and oxidizing first contaminants in said liquid phase;
    (c) providing an oxidizing solution from said oxidizing in (b);
    (d) oxidizing second contaminants in a gas phase of the gas stream above the sump with excess reactive species disengaging from the oxidizing solution in the sump;
    (e) oxidizing and scrubbing third contaminants in a gas-liquid contact assembly disposed above the gas stream; wherein (b)-(e) occur simultaneously.

2. The method of claim 1, wherein the reactive species is selected from ozone and plasma.

3. The method of claim 1, wherein the gas stream comprises a gas selected from the group consisting of carbon dioxide, nitrogen, chemical processing gas, and pollutant waste gas.

4. The method of claim 1, wherein the gas stream introduced into the reaction chamber is at a temperature of from 4° C. to 60° C.

5. The method of claim 1, wherein the gas stream introduced into the reaction chamber is at a pressure of from 1 Bar to 2 Bar absolute.

6. The method of claim 1, wherein the oxidizing solution as a pH of from 2 to 11.

7. The method of claim 1, further comprising removing the oxidizing solution from the sump and dispensing the oxidizing solution into the reaction chamber above the gas-liquid contact assembly.

8. The method of claim 7, further comprising directing a flow of the oxidizing solution in the sump and increasing residence time of the oxidizing solution in the sump.

* * * * *

UNITED STATES PATENT AND TRADEMARK OFFICE
CERTIFICATE OF CORRECTION

PATENT NO. : 8,574,521 B2  
APPLICATION NO. : 12/893043  
DATED : November 5, 2013  
INVENTOR(S) : Suchak et al.

Page 1 of 1

It is certified that error appears in the above-identified patent and that said Letters Patent is hereby corrected as shown below:

In the Specification

Column 7 - line 45 - delete "make-Lip" and insert therefore -- "make-up" --.

Signed and Sealed this  
Thirty-first Day of December, 2013

Margaret A. Focarino  
*Commissioner for Patents of the United States Patent and Trademark Office*